March 4, 1952  D. T. GRIGGS  2,587,995
SYSTEM FOR GUIDING AIRPLANES IN FLIGHT
Filed Oct. 5, 1943  5 Sheets-Sheet 1
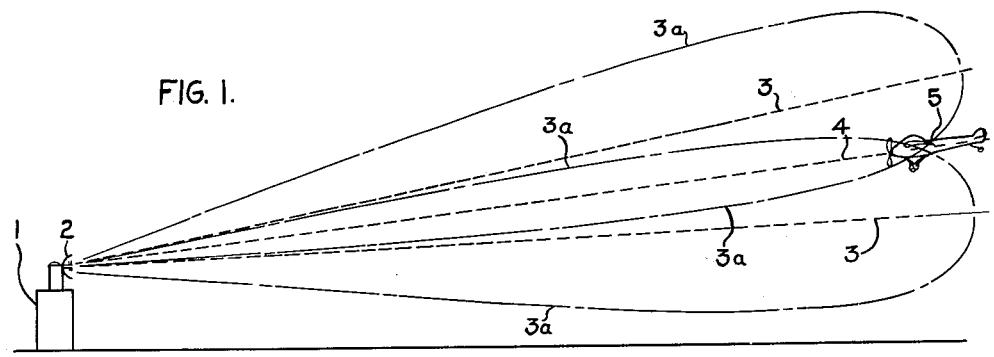
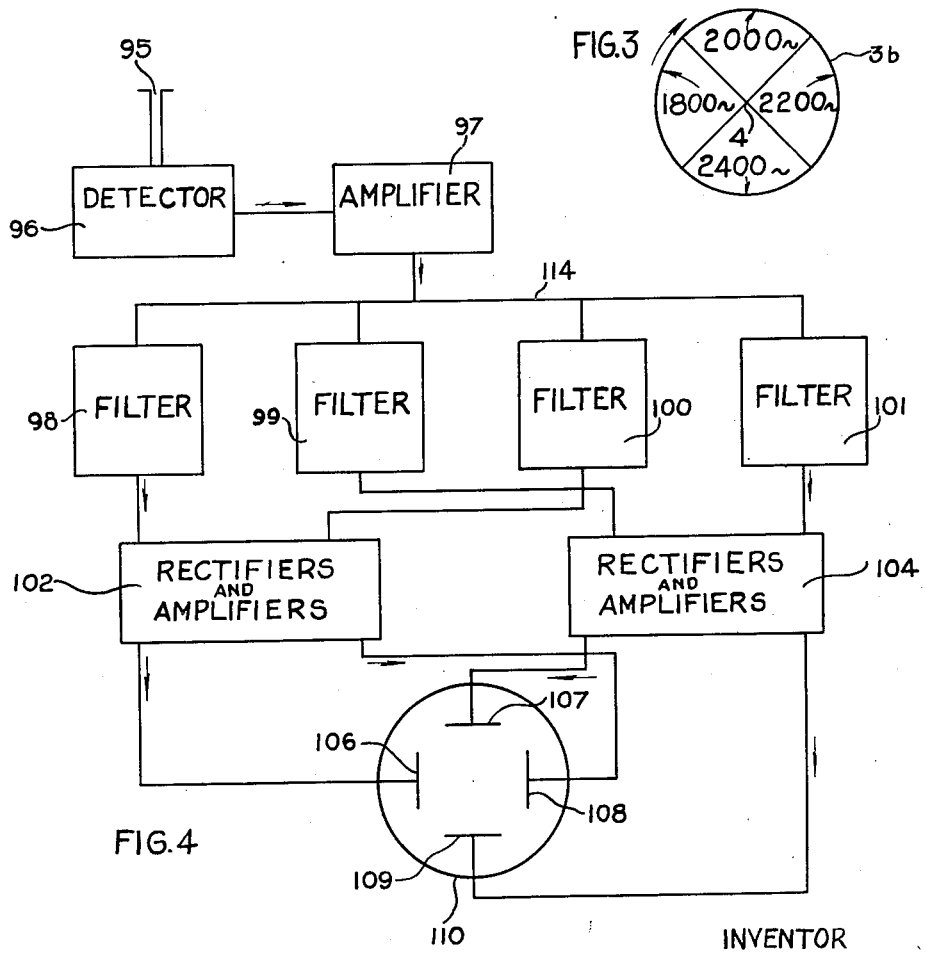
INVENTOR
DAVID T. GRIGGS
BY
ATTORNEY

INVENTOR
DAVID T. GRIGGS
BY
ATTORNEY

March 4, 1952 — D. T. GRIGGS — 2,587,995
SYSTEM FOR GUIDING AIRPLANES IN FLIGHT
Filed Oct. 5, 1943 — 5 Sheets-Sheet 3

INVENTOR
DAVID T. GRIGGS.
BY
ATTORNEY

March 4, 1952 — D. T. GRIGGS — 2,587,995
SYSTEM FOR GUIDING AIRPLANES IN FLIGHT
Filed Oct. 5, 1943 — 5 Sheets-Sheet 4

INVENTOR
DAVID T. GRIGGS
BY
ATTORNEY

March 4, 1952 D. T. GRIGGS 2,587,995
SYSTEM FOR GUIDING AIRPLANES IN FLIGHT
Filed Oct. 5, 1943 5 Sheets-Sheet 5

INVENTOR
DAVID T. GRIGGS
BY
ATTORNEY

Patented Mar. 4, 1952

2,587,995

UNITED STATES PATENT OFFICE 2,587,995

SYSTEM FOR GUIDING AIRPLANES IN FLIGHT

David T. Griggs, Washington, D. C., assignor, by mesne assignments, to the United States of America as represented by the Secretary of the Navy Application October 5, 1943, Serial No. 505,059

8 Claims. (Cl. 343—108)

This invention relates to systems for guiding airplanes in flight and particularly to a system in which a beam of electromagnetic radiation is provided to form a path along which the airplane travels, for instance, in landing, information being given to the pilot to enable him to cause the plane to follow this path.

One of the objects of the invention is to provide a system for guiding an airplane along a predetermined path.

Another object of the invention is to provide an accurate and dependable system for guiding an airplane to a blind landing.

Another object of the invention is to provide a blind landing system for airplanes in which the pilot of the plane is furnished a visible indication of his position with respect to a predetermined glide path.

A more specific object of the invention is to provide apparatus for importing predetermined different characteristics to a narrow beam of electromagnetic radiation for different portions of its movement as it scans a conical path in space.

Another more specific object of the invention is to provide apparatus, to be used in an airplane approaching a blind landing along a predetermined glide path coinciding with the axis of rotation of a beam of electromagnetic radiation, which will indicate the particular position of the beam with respect to said axis when strongest signals are received, thereby enabling the pilot of the airplane to navigate the airplane to an equisignal point lying on said axis of rotation of the beam.

A still further specific object of the invention is to provide a plurality of low-frequency oscillators operating at different frequencies to be used for controlling the modulation of electromagnetic radiation, and filter circuits in the receiver located in the airplane, each tuned to the frequency of one of said oscillators, for selecting and separating the different frequencies in the envelope of the received modulated electromagnetic radiations.

Other objects and objects relating to the arrangement of the various parts and the manner of connecting them electrically will be apparent as the description of the invention proceeds.

One embodiment of the invention has been illustrated in the accompanying drawings in which:

Fig. 1 is a schematic view representing an airplane approaching a landing field for a blind landing along a path defined by a beam of electromagnetic radiation;

Fig. 3 represents a cross section of the path of the axis of the electromagnetic beam which produces the glide path of the invention, indicating the modulation of the beam as the axis thereof passes through each quadrant;

Fig. 4 is a schematic representation of the receiving apparatus which is located in the airplane;

Figure 2:
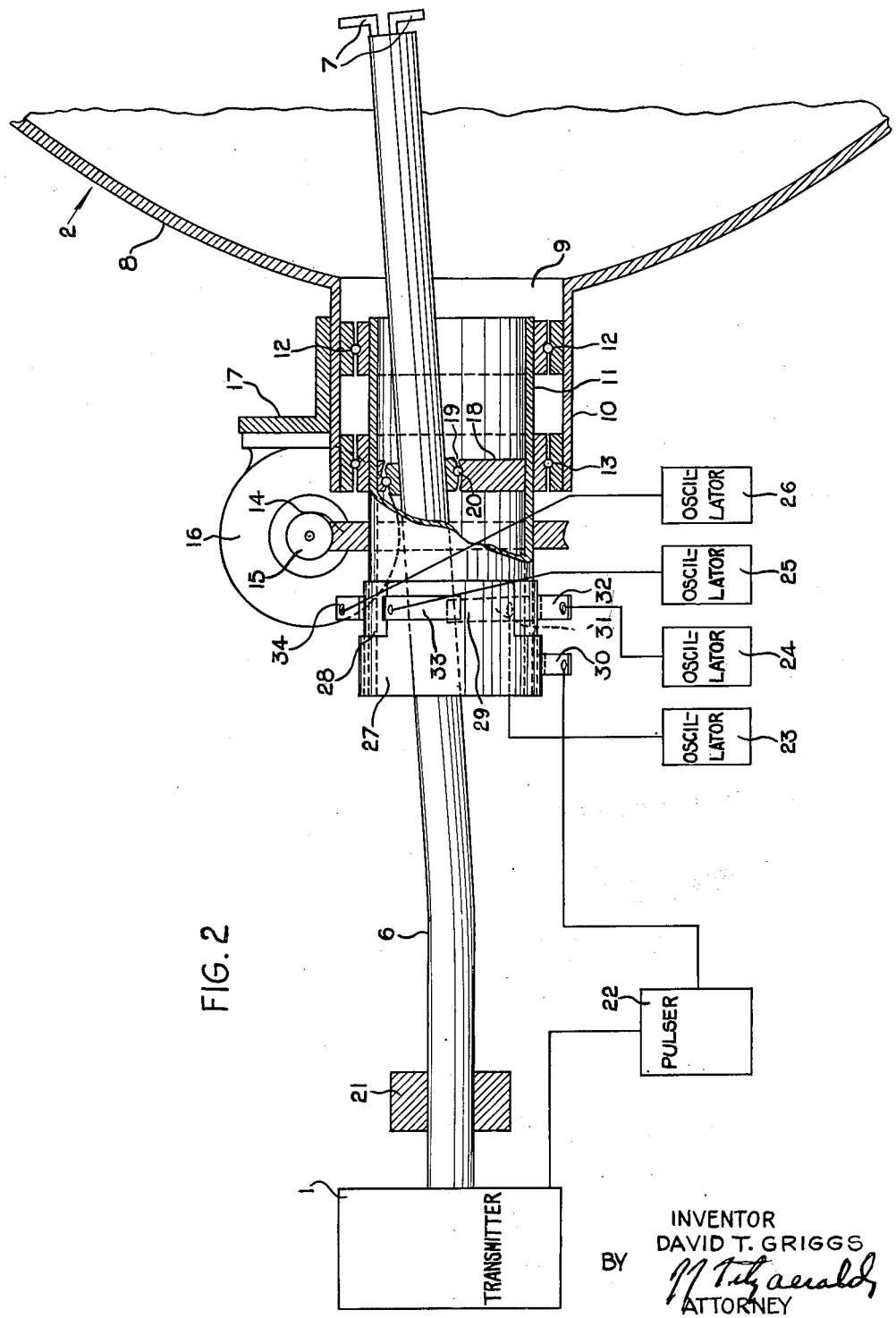
Fig. 2 is a part-sectional side elevational view of the transmitting antenna located at the landing field, showing the manner of and apparatus for wobbling the antenna to produce a conical beam of radiation and showing a block diagram of the transmitter and associated circuits.

Broadly the invention comprises a radio transmitter 1 which may be positioned, for instance, at a landing field, as indicated in Fig. 1, and is provided with a directive antenna system 2 to send out a beam of electromagnetic radiation the center line of which has been indicated at 3. This beam is then moved about an axis 4, preferably by revolving the beam about the axis, with the axis at a slight inclination to the axis of the beam, so that the axis of the beam traces a conical path. The dotted line 3 above the axis 4 represents the axis of the beam when it is at the highest point in its rotation, while the dotted line 3 below the axis 4 represents the axis of the beam at its lowermost point of revolution. The dot-and-dash line 3a shown surrounding these axis lines represent the radiation pattern or energy distribution plots of the beam in the two different positions shown. This radiation pattern slightly overlaps the axis 4, so that an airplane on the axis 4 will always receive radiation from the beam. The axis 4 corresponds in the disclosure of Fig. 1 to the glide path along which the approaching airplane 5 is to fly in order to make a blind landing.

As the beam of electromagnetic radiation is moved about the axis 4, it is given different characteristics for different portions of its path of movement. For instance, where the beam is rotated about the axis 4, the radiation may be modulated at a different low frequency for each quadrant through which the center of the beam rotates, as indicated in Fig. 3, where the circle 3b represents the path of the axis 3 of the beam.

A receiver may be positioned in the airplane 5 to receive the electromagnetic radiation directly from the transmitter 1, or, where the principle of radio-echoes is employed, the receiver may be located at some other point as, for instance, adjacent the transmitter and the radiation reflected from the airplane to the receiver. In either case the receiver picks up radiation from that part of the region in which the electromagnetic beam is moving which is occupied by the airplane. The receiver is associated with means to separate signals of different characteristics. In the case where the radiation is modulated at a different low frequency for each quadrant of rotation of the beam, this means may comprise four filter circuits, each adjusted to respond to the low-frequency modulation of the beam as it passes through one of the four quadrants, and the intelligence in the signals, thus produced, is applied to an indicating means which will either indicate directly to the pilot the deviation of the airplane from the axis 4 and the direction of such deviation, or will provide such indication at some remote point from which it may be transmitted to the pilot, thereby enabling the pilot to fly the airplane along the axis 4 to make a safe blind landing, where the system is used for landing purposes.

In Fig. 2, a schematic arrangement of one form of transmitter is shown. The transmitter 1 may be provided with a suitable high-frequency oscillator in order to produce oscillations, for example, in the microwave region, and this may be connected by a suitable transmission line 6, such as a coaxial line, to a radiator 7 which may be an ordinary dipole. In order to provide the desired directivity of the radiated energy, a reflector 8, such as a paraboloid, is mounted so that the radiator 7 is in the region of the focal point, the arrangement being such that the electromagnetic radiation is directed in a narrow beam from the reflector 8.

Various means may be used to revolve this beam about the axis 4 as, for instance, by wobbling the entire apparatus including the transmitter and the antenna system. However, I have shown an arrangement whereby the dipole end of the transmission line 6, without itself rotating about its own center, is caused to revolve within the stationary reflector 8 and about the axis thereof thus maintaining constant the plane of polarization of the radiating energy. The dipole is positioned with respect to the focal point of the reflector so that when revolved in this manner the best uniform focusing of the beam is obtained for all positions of the radiator, and the axis of the beam is caused to trace the conical path already mentioned. The dipole is preferably positioned vertically so as to maintain a vertical plane of polarization to reduce the effect of ground reflections.

In order to accomplish this rotation of the radiator, the coaxial line 6 is made relatively long and is supported some distance from the radiator end which passes through an opening 9 in the parabolic reflector 8 sufficiently large to permit the circular movement. The reflector 8 is provided with a sleeve 10 within which another sleeve 11 is mounted to rotate freely on ball bearings 12 and 13. The sleeve 11 protrudes from the open end of the reflector sleeve 10 and a worm wheel 14 surrounds it and is rigidly secured to it. This worm wheel meshes with a worm 15 which is mounted on the shaft of a motor 16, the motor and reflector both being rigidly supported, as, for instance, upon an angle iron or bracket 17. The motor is driven from any desired source of electrical energy (not shown), and causes the worm 15 to rotate, thus rotating the worm wheel 14 and the sleeve 11 which is attached to it.

A partition 18 is provided inside of the sleeve 11 and this partition has a hole 19 through which the transmission line 6 extends. The opening 19 is provided with suitable ball bearings 20 to permit rotation of the partition 18 about the transmission line 6 and still permit the angle of the transmission line with respect to the axis of rotation to change. The transmission line adjacent the transmitter 1 is held rigidly by a fixed member 21, and, as the sleeve 11 is rotated, the transmission line is caused to bend continuously between the fixed support 21 and the bearing 19 in the partition 18 as the radiator 7 traces a circle within the reflector 8 about the axis thereof. Although the transmission line 6 is substantially rigid, there is enough length between the fixed support 21 and the partition 18 to permit sufficient bending of the line to cause the radiator to move as described.

The high-frequency oscillation of the transmitter may be modulated in any desired manner to give the beam different characteristics for the different quadrants through which it rotates. I prefer to produce discrete pulses of oscillations with the transmitter energized only during the pulses and off between pulses. The time duration of these pulses may be different for each quadrant through which the beam rotates, or I may prefer to produce uniform pulses and vary the repetition rate thereof.

An arrangement for pulsing the transmitter with uniform pulses at different rates is shown in the drawings. A pulser 22 is provided together with four separate low-frequency oscillators 23, 24, 25, and 26 to control the pulser, these oscillators being connected successively to the pulser by means of a commutator 27 which rotates with the sleeve 11. The pulser 22 is connected to the transmitter 1, and the transmitter is arranged to produce and deliver its oscillations to the radiator 7 only during the period of the pulses delivered to it by the pulser.

The sleeve 11 which is rotated by the motor 16 extends outwardly beyond the worm wheel 14 and supports the commutator 27 which may comprise a metal band surrounding the sleeve and spaced from it by another sleeve 28 of insulating material. The band 27 has an extension 29 on one side thereof which has a circumferential width equal to approximately one-quarter of the circumference of the band 27. A conducting brush 30 is mounted in a fixed position to bear against the band 27 so that it makes contact with it continuously while the sleeve 11 is rotating. This brush 30 is connected to the pulser 22.

Four other brushes 31, 32, 33, and 34 are positioned in equally spaced relation around the circumference of the sleeve 11 at a point where they will have contact with the extension 29 as it rotates past the brushes. The brush 31 is connected to the oscillator 23; the brush 32 is connected to the oscillator 24; the brush 33 is connected to the oscillator 25; and the brush 34 is connected to the oscillator 26. The dimensions of the contact extension 29 and the bearing surfaces of the brushes are such that, as the sleeve 11 rotates, there will be only one of the oscillators 23, 24, 25, and 26 connected to the pulser 22 at any given instant, but they will be connected in sequence and each will be connected for a period of time equal to approximately one-quarter of the time of revolution of the radiator 7 about the axis of the reflector.

Any suitable type of stable, low-frequency oscillator may be used for modulating the oscillator of the transmitter through the pulser 22 as the electromagnetic beam rotates through one quadrant of its circular movement. I have found the oscillator shown in Fig. 5 to be excellent for the purpose, since it is easily tuned, covers a wide frequency range, and has good frequency stability. This oscillator is a modified form of Wien bridge, degenerative, oscillator and may comprise a twin triode tube 36 connected across the arms of a Wien bridge circuit. The two anodes 37 and 38 are connected respectively through load resistors 39 and 40 to a source of positive potential, indicated at 41. The cathode 42, associated with the plate 37, is connected to ground at 45 through a resistance 43 and through a special resistance 44 having a positive temperature coefficient of resistance. A small wattage tungsten electric lamp has been found satisfactory for the resistance 44. The cathode 46, associated with the plate 38, is also connected to ground through a resistance 47 which is shunted by a condenser 48. The grid 49, associated with the cathode 42 and plate 37, is connected through a variable resistance 50 to ground, and this resistance is shunted by a condenser 51. The grid 49 is also connected through a variable resistance 52 and a condenser 53 to a point 54 forming one input corner of the bridge circuit. This point 54 is also connected through the variable resistance 55 and the fixed resistance 56 to the cathode 42.

The grid 57, associated with the cathode 46 and plate 38, is connected through a resistance 58 to ground and also by means of a condenser 59 to the plate 37 of the other triode. The plate 38 is connected through a condenser 60 to the point 54.

The Wien bridge oscillator is essentially a resistance-capacity coupled two stage amplifier with positive and negative feedbacks of proper amounts. The positive feedback, necessary in any circuit to maintain oscillations, is brought from the plate 38 of the second triode to the grid 49 of the first triode by means of a narrow bandpass, resistance-capacity filter combination comprising the condensers 51 and 53 and the variable resistances 52 and 50 which allows positive feedback, in sufficient amount to maintain oscillations, to reach the grid of the first triode only at frequencies very close to the pass frequency of the filter. The phasing of feedback voltage at other frequencies produces a degenerative effect.

The circuit may be tuned by adjusting the variable resistances 52 and 50 the moving arms of which may be mounted on the same shaft. At the resonant frequency $\omega$, we have the following equation:

$$\omega C_{51} R_{52} = \frac{1}{\omega C_{53} R_{50}}$$

where $C_{51}$ and $C_{53}$ are condensers 51 and 53 respectively and $R_{50}$ and $R_{52}$ are resistances 50 and 52 respectively. It will be seen that by increasing $R_{50}$ and $R_{52}$, $\omega$ will decrease to maintain proper phase of the positive feedback voltage.

Since at the resonant frequency the phase of the feedback is positive, the circuit tends to oscillate strongly with very high gain, while at any frequency off the resonant frequency the gain is very low and rapidly decreasing.

The resistance 44 with the positive temperature coefficient of resistance in the circuit of the cathode 42 is for the purpose of providing negative feedback necessary to decrease the harmonic distortion, stabilize the oscillations, and stabilize the output voltage. If the output voltage increases, the current through the resistance 44 also increases with the result that this resistance 44 increases. This increases the negative feedback and therefore tends to reduce the output voltage again.

The amount of negative feedback may be adjusted by adjusting the variable resistor 55 which also therefore controls the amplitude of the oscillations within a limited range. The range is limited because a certain amount of negative feedback is necessary for the reasons stated above.

Although there may be slight interaction between the setting of the resistances 50, 52, and 55, this will be noticeable only when the tuning is changed over a wide range. In the present instance, I tune the oscillators 200 cycles apart, and the tuning is then not changed but maintained at these frequencies at all times.

Other types of oscillators may be used to produce the low-frequency oscillation for controlling the pulser during one quadrant of radiator revolution, but it is important that the oscillator be stable so that the frequency cannot change from the action of the mechanical commutator by changing the loading or for other reasons. Hence the oscillator just described may be preferred.

Figure 5:
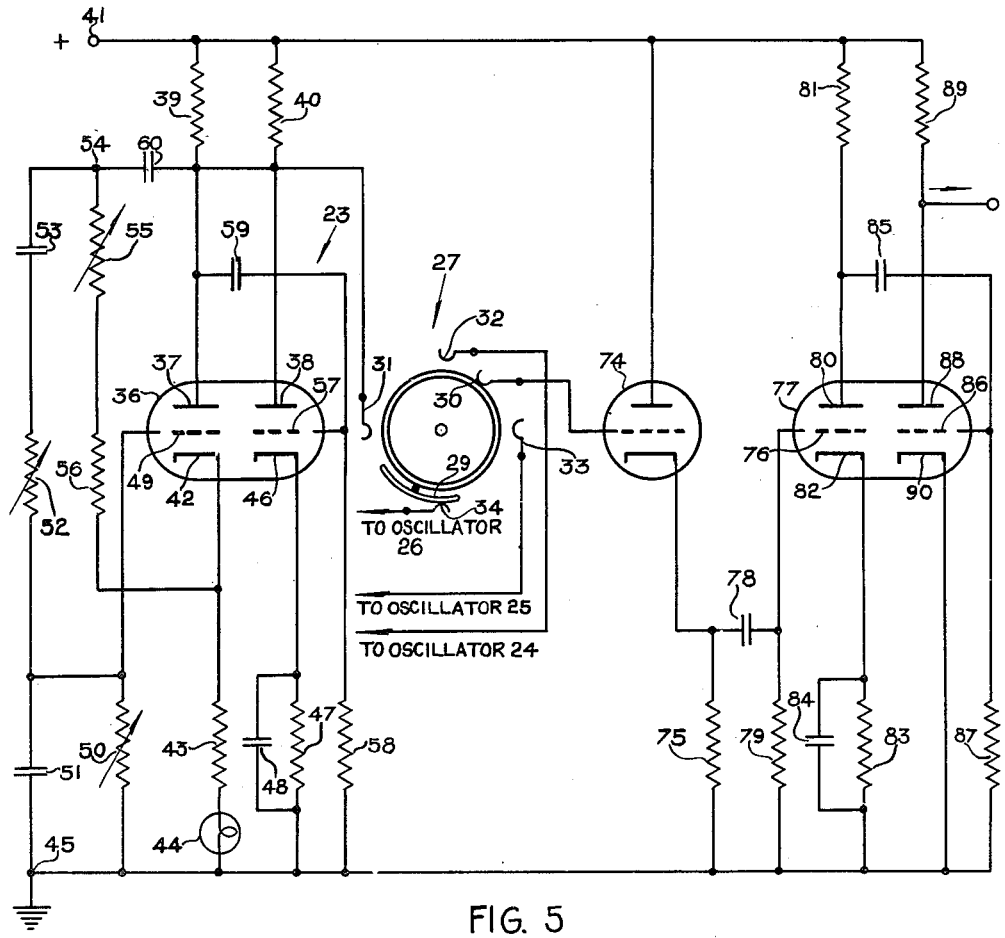
Fig. 5 is a circuit diagram of one of the low-frequency oscillators used to modulate the radiation.

In Fig. 5, a single oscillator, represented by the tube 36 and associated circuit, is shown, but it will be understood that there are in the present system three additional similar oscillators, each tuned to a different low frequency, as already explained. The output of the oscillator in each case is taken from the plate 38 of the tube 36 and connected to one brush of the commutator 27. Thus, the oscillator shown in Fig. 5, which may be the oscillator 23 of Fig. 2, is connected to the brush 31. This oscillator will be tuned, for instance, to a frequency of 1800 cycles per second. The oscillator 24 is similarly connected to the brush 32. This oscillator will be tuned to a frequency of 2000 cycles per second. The oscillator 25 is connected to the brush 33, and this oscillator will be tuned to a frequency of 2200 cycles per second. The fourth oscillator 26 is connected to the brush 34, and this oscillator will be tuned to a frequency of 2400 cycles per second. These frequencies have been arbitrarily chosen and, of course, other higher or lower frequencies may be used and the separation between them may be different, as desired.

The segment 29 of the commutator turns with the eccentric 18, as has already been stated, and this segment is connected by means of the brush 30 to the grid of a triode tube 74 which may be mounted in the pulser or modulator 22 and the plate of which is connected directly to the source of positive potential, as indicated. The cathode of this tube is connected through a resistance 75 to ground.

The resistance drop in the cathode resistance 75 of the tube 74 is applied to the first grid 76 of a double triode tube 77 through a condenser 78, this grid being connected through a grid resistor 79 to ground. The plate 80 of the first triode of this tube is connected through a load resistor 81 to a source of positive potential, while the cathode 82, associated with the grid 76, is connected to ground through a resistor 83, shunted by a large condenser 84. The plate 80 is also connected through a small condenser 85 to the grid 86 of the other triode of the tube, this grid being also connected through a grid resistor 87 to ground. The plate 88 of this portion of the tube is connected through a load resistor 89 to a source of positive potential, while the cathode 90 is connected directly to ground. The output of the tube 77 is taken from the plate 88 of the second triode.

The values of the various components of this double triode tube 77 are so chosen that the circuit performs a clipping and peaking action. The sine waves received by it are first squared by overdriving the first triode of the tube 77. The square waves thus formed are then differentiated in a suitable circuit, as, for instance, that including the condenser 85 and resistor 87. The negative peak from the trailing edge of the square wave is amplified by the second triode of the tube 77 and used to actuate the pulser 22; the positive peak from the leading edge of the square wave is not passed through because of the bias of the tube. The tubes 74 and 77 may be a part of the pulser 22 which modulates the oscillator of the transmitter.

The triode tube 74 acts as a buffer to prevent the clipping and peaking stage which follows from loading the oscillators. Because of this buffer action there is very little change in the oscillator output when the switching takes place, which is a desirable feature.

It will be understood that the four low-frequency oscillators 23, 24, 25, and 26 are operating continuously, and as the motor 16 rotates to cause the radiator 7 to move in a circle within the reflector 8, the segment 29 of the commutator is rotated by the eccentric 18 and causes the pulser to be connected in sequence to these four oscillators, a different oscillator being connected to the pulser for each quadrant of rotation of the radiator. Since the pulser controls the high-frequency oscillator of the transmitter, the radiated energy will be pulsed at the frequency of one of the low-frequency oscillators depending on the particular quadrant in which the radiator is moving.

In Fig. 4 I have shown a block diagram of the receiving apparatus which may be located in the airplane. A suitable antenna 95 mounted vertically to receive the vertically polarized radiation from the transmitter 1, is connected to a detector 96 which may be a crystal detector or a bolometer in which the received energy is caused to vary the temperature and hence the resistance of a fine wire resistor. A voltage varying at the frequency of the received pulses appears at the output of the detector 96 and is amplified by an amplifier 97, and the output of the amplifier is delivered to four separate filters, 98, 99, 100, and 101, the filter 98 being designed to pass only a frequency of 1800 cycles per second, the filter 99 only a frequency of 2000 cycles per second, the filter 100 only a frequency of 2200 cycles per second, and the filter 101 only a frequency of 2400 cycles per second. The filters 98, 99, 100 and 101 are connected to rectifiers and differential amplifiers in pairs, the filters 98 and 100 being connected to the two input circuits of a rectifier and differential amplifier circuit 102. The two outputs of this circuit 102 are connected to the deflecting plates 106 and 108 of an electrostatic cathode ray tube 110, which, in the present instance, is shown as the indicating device. The filters 99 and 101 are connected to the two input circuits of a rectifier and differential amplifier circuit 104 the two outputs of which are connected to the deflecting plates 107 and 109 of the cathode ray tube. The circuits 102 and 104 will be subsequently described.

An electromagnetic tube might be used as the indicating device in which case the deflecting coils thereof would be included in the output circuits of the amplifiers 102 and 104.

Figure 6:
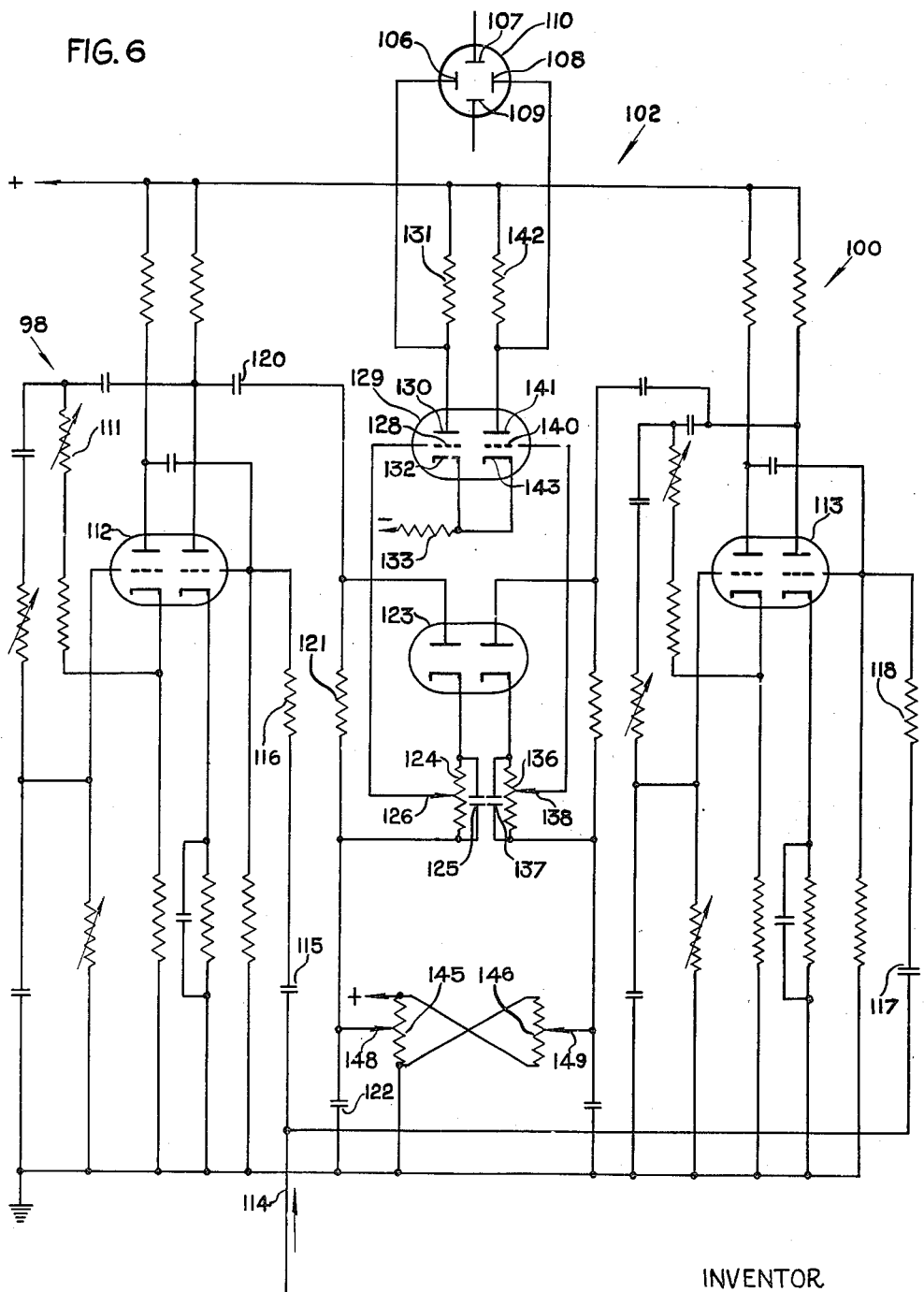
Fig. 6 is a circuit diagram of two of the filters used at the receiver in the airplane showing the manner of connecting them to the deflecting plates of the cathode ray tube.

Any type of filter may be used for separating the frequencies at which the radiation is modulated as the beam passes through the different quadrants. A filter which is very desirable, for the purpose because it is light in weight, has a high Q (ratio of energy stored per cycle to energy dissipated per cycle), and is stable, is shown in Fig. 6 and comprises a circuit similar in appearance to the oscillating circuit of Fig. 5 with the exception that the resistance 44 in the cathode circuit of the first triode is omitted and the feedback resistor 111, which is similar to the resistance 55 of the circuit of Fig. 5, is adjusted so that the circuit will be just prevented from oscillating. In the circuit of Fig. 6, two such filter circuits are shown, comprising the double triode tubes 112 and 113. The circuits associated with these tubes are so nearly similar in appearance to the oscillator circuit shown in Fig. 5, associated with the tube 36, that it is not considered necessary to describe the circuits in detail.

The circuit associated with the tube 112 may represent the filter 98 of Fig. 4 and may be tuned to a frequency of 1800 cycles per second. The circuit associated with the tube 113 may represent the filter 100 and may thus be tuned to a frequency of 2200 cycles per second. In other words these two filters are tuned to the frequencies used to modulate the transmitter when the beam is in opposite quadrants, and there are two additional filters 99 and 101, similar to those shown in Fig. 6 but tuned to the frequencies used for modulation of the transmitter when the beam is in the other two quadrants, in this case, 2000 and 2400 cycles per second.

The output signal from the amplifier 97 is delivered to the filter circuits including the tubes 112 and 113 by applying the signal to the grid of the second triode in each tube. Thus, the wire 114 shown at the bottom of the figure, delivers the signal through the condenser 115 and the resistor 116 to the grid of the second triode of tube 112, and in a similar manner through the condenser 117 and resistor 118 to the grid of the second triode of the tube 113.

The impedance looking into the grid or input of the second triode of each of these filter circuits is maximum at the resonant frequency of each circuit. The output impedance of the amplifier 97 may be made as high or higher than the maximum input impedance of these filters. As the frequency of the amplifier output voltage varies, maximum power will be transferred to a filter for that frequency at which the input impedance of the filter comes closest to matching the output impedance of the amplifier. This occurs in each case at the resonant frequency of the filter. At all other frequencies, above or below the resonant frequency, the input impedance of, and hence the power transferred to, a filter decreases as the frequency departs from the resonant frequency of that particular filter. This change in input impedance of the grid of the second triode of the filter circuit is an intrinsic part of the operation of the feedback mesh. Each filter will then select the particular frequency to which it is tuned from the frequencies delivered to it and will produce a strong sine wave at that frequency on the plate of the second triode tube.

It will be seen that the filters will be excited in turn during the revolution of the electromagnetic beam, if the airplane is in the vicinity of the landing path, because of the appreciable beam width. If the airplane is directly on the axis of the cone described by the electromagnetic beam, each filter will be excited in turn an equal amount as the electromagnetic beam revolves. These equal excitations are balanced in the differential amplifiers and the electron beam of the cathode ray tube will remain at the center. If the airplane departs from the correct path into the quadrant, for instance, in which the electromagnetic beam is modulated at 2200 cycles per second, the filter tuned to 2200 cycles per second will receive an increased excitation and the other filters a decreased excitation, depending on the displacement. This will result in the electron beam of the cathode ray tube moving off the center into a portion of the tube corresponding to the 2200 cycle per second quadrant of the electromagnetic beam.

The plate of the second triode of the tube 112 is connected through a condenser 120 and through a resistance 121 and a large condenser 122 to ground. Across the resistance 121 is connected one anode and cathode of a twin diode tube 123, the resistance of a potentiometer 124 being connected in the cathode circuit thereof. This resistance has a condenser 125 shunted across it, the combination being arranged to have a time constant of about 5 seconds, or considerably longer than the period of one cycle of the output of the filter circuit.

The arm 126 of the potentiometer 124 is connected directly to the grid 128 of a twin triode tube 129, the associated plate 130 of which is given a positive potential through a suitable load resistor 131 and is also connected to the deflecting plate 106 of the cathode ray tube 110. The cathode 132, associated with the grid 128 and plate 130, is given a negative potential through a resistance 133.

The voltage drop across the resistance 121 caused by the sine wave from the output of the filter at the particular frequency thereof is impressed across the diode 123 and is rectified and the time constant of the cathode circuit places a potential on the grid 128 of the twin triode tube 129 corresponding to the amplitude of the signal passing through the filter 98. Thus a constant potential proportional to the amplitude of this signal is applied to the deflecting plate 106 of the cathode ray tube 110.

In the same manner the circuit associated with the tube 113, forming the filter circuit 100, is arranged to apply a sine wave voltage at the frequency of that particular filter across the other diode of the twin diode tube 123, this diode combination being provided with a cathode resistance which forms a potentiometer 136, shunted by a condenser 137. The arm 138 of the potentiometer 136 is connected to the grid 140 of the other triode section of the tube 129, the plate 141 of that tube being connected to the source of positive potential through a load resistor 142 and also to the deflecting plate 108 of the cathode ray tube 110. The cathode 143 is connected to the cathode 132. The sine wave at the frequency of the filter 100 is thus rectified by the other portion of the twin diode tube 123 and integrated and eventually applied as a constant average potential to the deflecting plate 108.

Since the cathodes 132 and 143 of the twin amplifier tube 129 are connected together and to the common cathode resistor 133, an increase in current in one triode of the tube will cause the cathode of the other triode to increase in potential, thus tending to decrease the current in the other triode. Therefore, this amplifier tube is a differential amplifier, accentuating the difference in the signals applied to the two grids. This adds to the differential effect on the deflecting plates of the cathode ray tube.

Means is provided to adjust the bias of the diodes in the tube 123, this means comprising a double potentiometer or attenuator having two windings 145 and 146, each of which has one end connected to ground and the other end connected to a source of positive potential. The winding 145 has an arm 148 which is connected to the lower end of the resistance 121, while the winding 146 of the potentiometer has an arm 149 which is connected to the lower end of the corresponding resistance in the circuit of the tube 113. The arrangement of the potentiometer is such that as the arm 148 moves toward ground, the arm 149 will move toward the positive end of the winding 146 and vice versa, so that as the potential is increased on the first half of the twin diode tube it is decreased on the second half, and vice versa, thus permitting the circuit to be adjusted so that the same amount of signal will appear on the deflecting plate 106 as on the deflecting plate 108 for equal output of the filters 98 and 100. When the signals are thus equal the electron beam will remain in the center of the tube, but if the potential decreases on the plate 106, for instance, and increases on the plate 108, the electron beam will move towards the plate 108, and the position of the spot of light will be determined by the relative amplitude of the signals produced by the filters 98 and 100.

The tubes 123 and 129 of Fig. 6 and the associated input and output circuits represent the rectifier and amplifier circuit 102 of Fig. 4. A similar circuit will be connected to the filters 99 and 101.

Figure 7:
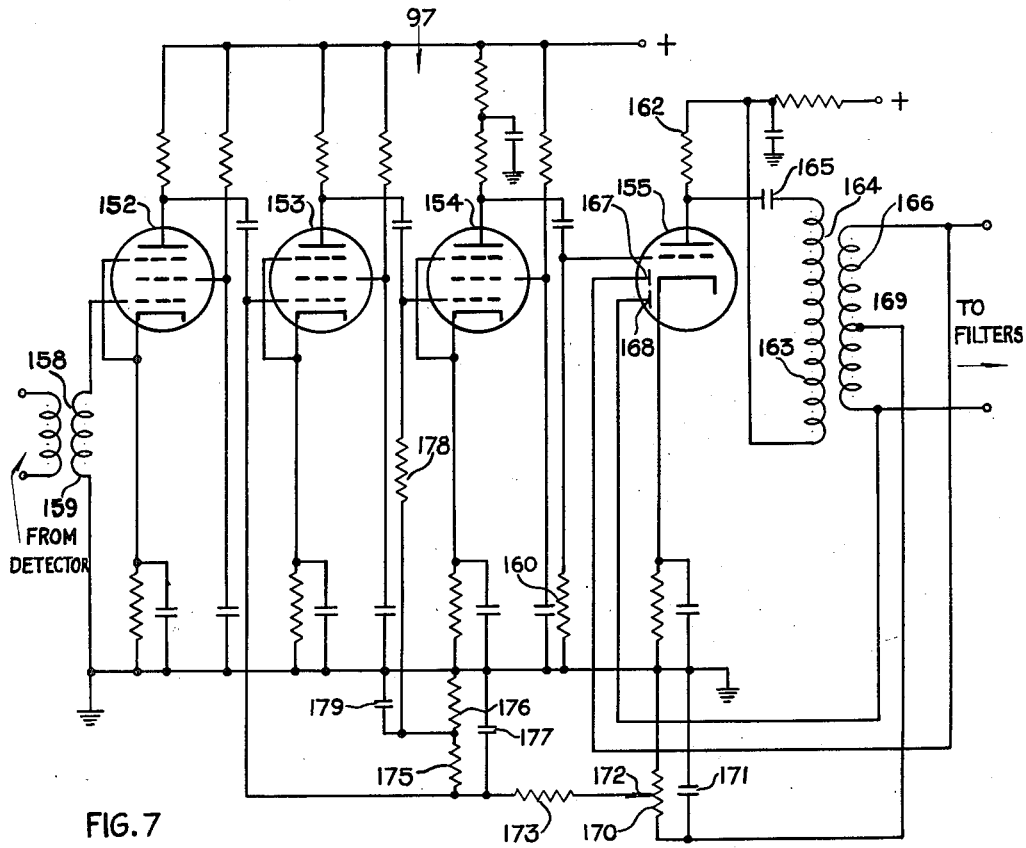
Fig. 7 is a circuit diagram of an amplifier used in the receiver, showing the manner of obtaining automatic volume control.

In Fig. 7 I have shown a circuit for the amplifier 97 in which I have incorporated an automatic delayed volume control in order to present substantially the same signal amplitude regardless of the distance that the airplane is away from the transmitting station. In this circuit, three pentode tubes 152, 153, and 154 are shown connected in cascade by the usual form of resistance-capacity coupling, the output of this three tube amplifier being connected by means of resistance-capacity coupling to a triode tube 155 having, in addition, a pair of diodes incorporated therein. The input from the detector 96 may be coupled to the grid circuit of the tube 152 by means of a transformer 158, the secondary 159 of which is between the grid and ground.

The grid of the triode tube 155 is connected through a grid resistance 160 to ground. The grids of the tubes 153 and 154, however, are biased automatically by the amplitude of the signal produced in the plate circuit of the tube 155. To this end the load resistance 162, connected to the plate of the tube 155, is shunted by the primary 163 of a transformer 164, this primary being in series with a condenser 165. The secondary, 166 of the transformer 164, has its two ends connected respectively to the additional diode plates 167 and 168 of the tube 155, while the midpoint 169 of the secondary is connected through a resistance 170 to ground, this resistance being shunted by a condenser 171.

The resistance 170 forms a potentiometer, the arm 172 of which is connected through a resistance 173 to the grid of the tube 153. The bias of this grid, therefore, is controlled by the potential drop across a portion of the resistance 170 between the arm 172 and ground.

In order to bias the grid of the tube 154, a pair of resistances 175 and 176 are connected in series between the grid end of the resistance 173 and ground, these two resistances being shunted by a condenser 177. The juncture of the resistances 175 and 176 is then connected through a resistance 178 to the grid of the tube 154 and also connected to ground through a condenser 179.

In the operation of this automatic volume control, as the output of the tube 155 increases, current will increase through the resistor 170 and the other resistances 173, 175, and 176. This has the effect of swinging the grids of the tubes 153 and 154 in the negative direction after a predetermined time depending on the time constant of the resistance-capacity combinations of the circuits, which thereupon reduces the signal in the output of the tube 155. This time constant is longer than the time required for the beam to make one cycle of the rotation, and the effect is to maintain the signal constant regardless of changes in the amplitude of the input signal caused by the airplane approaching the transmitter.

When the four filters are connected similarly to the connection in Fig. 7 to the four deflecting plates 106, 107, 108, and 109, the spot of light in the cathode ray tube will be held in the center when the signals from the electromagnetic beam in the four quadrants of its revolution are equal. If the signal from the beam in one quadrant is increased over that received from the beam when it is in the other three, the electron beam in the cathode ray tube will swing towards that particular deflecting plate and the spot of light will thus move towards one side of the tube.

If the automatic volume control were not employed, as the airplane came in close to the transmitter, all signals would saturate the amplifier regardless of the position of the airplane with respect to the glide path; hence the indication would be valueless.

The long time constant of the automatic volume control circuit also allows sudden movements of the airplane from the glide path to be detected and indicated.

If a pilot is attempting to make a landing by using this system and is flying on the axis of rotation of the beam, the signals picked up from the beam will be the same for each quadrant, and the spot of light on the cathode ray tube will appear at the center. If, however, he deviates from the axis 4, around which the beam is rotating, into one of the quadrants of rotation, the signal produced by the beam when in that quadrant will be stronger than the rest, and the signal produced by the beam when in the opposite quadrant will be correspondingly weaker and the spot of light will move off the center in the direction of the deflecting plate having the stronger signal. The pilot need only then shift the direction of his airplane until the spot of light appears in the center again to get back onto the axis of the glide path.

Figure 8:
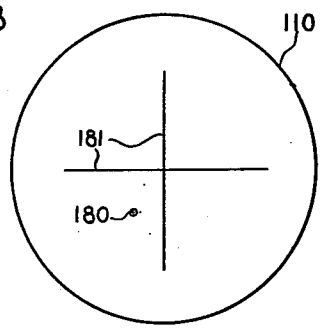
Fig. 8 is a front view of a cathode ray tube representing one form of indication for the pilot of the airplane so that he will know where he is with respect to the axis of rotation of the beam.

I prefer to connect the apparatus so that when the spot of light is below the center of the tube, the pilot will point his airplane downwardly to get on to the glide path, and when the spot of light is above the center of the tube, the pilot will point his airplane upwardly to get back on the glide path. Similarly, if the spot of light is at the left or the right of the center of the tube, the pilot will turn to the left or right respectively to center his airplane on the glide path. Fig. 8 shows the face of a cathode ray tube provided with horizontal and vertical guide lines 181 crossed at the center and with a spot of light 180 shown below the center of the tube and to the left. With such an indication, according to the arrangement already described, the pilot would direct his airplane downwardly and to the left to bring the airplane onto the axis of the glide path and cause the spot of light to reach the center again.

As the airplane approaches the transmitter the signal picked up by the receiver becomes stronger and stronger, but the automatic delayed volume control in the receiver compensates for this, so that the amplitude of the signal applied to the indicating device changes very little with distance. For a blind landing system, with the angle of the glide path set at about two degrees, it was found by experiment that the airplane touched the ground about a quarter of a mile from the antenna, so that there is no particular danger of the airplane flying directly into the antenna.

Figure 9:
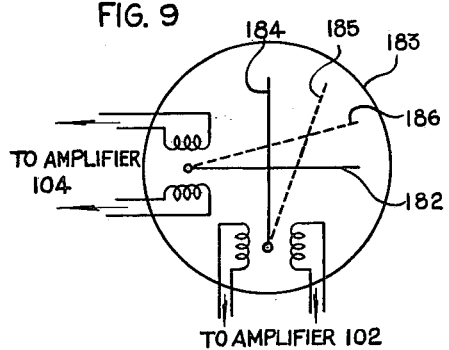
Fig. 9 is a front view of a modified form of indicator for the pilot.

I have shown the cathode ray tube as the means of indication because it is convenient to connect the deflecting plates to the output of the differential amplifier circuit, and the indication produced by it is easy for the pilot to follow. However, it will be understood that any kind of indication may be used with the system. For instance, the signals from two opposite quadrants of the beam may be arranged to control one needle of a crossed-pointer meter, as indicated in Fig. 9, while the signals from the other two quadrants may be arranged to control the other needle. The coils controlling the needles may, in this case, be connected in series in the plate supply circuits of the amplifier tubes. The needle 182 of the meter 183 will remain in the center as long as the signals from the differential amplifier 104 to which its coils are connected remain equal. As soon as one signal is stronger than another, the needle 182 will move in the direction of the stronger signal and thus indicate the vertical deviation. The other needle 184 will remain in the center as long as the signals from the differential amplifier 102 to which its coils are connected are equal. When one becomes stronger than the other, the needle will move towards the stronger signal. The point of intersection of these needles will indicate to the pilot the direction of deviation of the airplane from the glide path.

The dotted lines 185 and 186 represent the position of the needles 184 and 182, respectively when the airplane is below and to the left of the glide path, following the same directive arrangement, as has been described in connection with the cathode ray tube indicator.

The four-quadrant system described above is desirable in many instances, but it has been found that good results can be obtained under certain conditions by dividing the rotation of the beam into two sections, an upper and a lower section, so as to indicate only the deviation from the center of the beam in the vertical direction. With such a modified system it will be understood that only two low-frequency oscillators are used at the transmitter, and two filters at the receiver. With this system a simple differential meter will give just as good an indication as the cathode ray tube.

In tuning up the system, first the modified oscillators are tuned for the desired modulating frequencies and the regeneration control set to get good sine waves. Next the filters are made to oscillate with no input signal by turning up the regeneration control. Each is then tuned to the exact frequency of a different one of the modulating oscillators at the transmitter, and the regeneration control turned down again until oscillation ceases. Then the regeneration control is adjusted so that each filter gives the same amplitude of sinusoidal output for a given input signal amplitude from a signal generator at its resonant frequency. Finally, the attenuators are adjusted so that a constant signal input produces the same deflection on the cathode ray tube for each of the four frequencies.

It will be seen from the description given above that by using my system for blind landing, a pilot may guide his plane down to a landing along the axis of revolution of a beam of electromagnetic radiation sent out from the transmitter at the landing field. From an inspection of the automatically operated indicator the pilot can see when he is off the desired glide path and in what direction he is off, or, if the indicator is at a remote point, he can be advised of his deviation from the path, so that he may maintain his position on the path as he approaches the field.

The arrangement shown and described provides a straightline glide path for the airplane. In some instances, however, it may be desirable to provide a curving glide path. This may be done by varying, under control of the range of the airplane, the relative amplitudes of the low-frequency oscillators producing the modulating signals for the different quadrants of the beam as the airplane approaches the transmitter. The amplitude of the signals reaching the airplane will then not be the same when the airplane is on the axis of the revolving beam, and the pilot will have to shift the airplane off the axis to cause the spot of light to find the center of the tube at which time the airplane will be on the predetermined curved gliding line. A curved glide path might also be produced by moving the axis of revolution of the beam in some predetermined manner as the airplane approaches the transmitter.

Airplanes may be landed by my system not only at regular ground airports but also upon the water and upon airplne carriers. In the latter case the antenna mechanism for producing the conically scanned beam would have to be stabilized so as to compensate for the movement of the ship. This can be done in a known manner.

Various modifications may be made in the arrangements shown and described without departing from the spirit of the invention, and I do not therefore desire to limit myself to what has been shown and described except as such limitations occur in the appended claims.

What I desire to claim and secure by Letters Patent is:

1. In a system for guiding an airplane in flight, the method which comprises the steps of directing a concentrated beam of electromagnetic radiation at a slight angle to a predetermined glide path for an airplane, continuously revolving said beam of radiation about said glide path while maintaining the angular relation thereof, modulating said beam as it rotates with a different frequency for each quadrant of revolution, receiving said radiation in an airplane in the vicinity of said beam, separating by means of the modulation frequency differences of the received signals the energy received from said beam when passing through one of said quadrants from the energy received when said beam is passing through the other of said quadrants, creating a spot of light on a screen, causing said spot to assume a predetermined position on said screen when said signals from said beam when in said different quadrants maintain a predetermined amplitude relation, and causing said spot of light to move away from said predetermined position when the amplitude relation of said signals is altered, the magnitude and direction of movement of said spot being controlled by the amplitudes of the signals from said beam in the different quadrants.

2. A system for guiding an airplane in flight which comprises means to concentrate electromagnetic radiation in a relatively narrow beam at a slight angle to a line forming a predetermined glide path for an airplane, means to revolve the beam so formed about said line, while maintaining the angle thereto, means to modulate said radiation at a different frequency as it passes through each quadrant of revolution, means in said airplane to receive said radiation when said airplane is in the vicinity of said beam, means to separate the signal received from said beam when said beam is in one quadrant from the signals received from said beam when said beam is in the other quadrants, a screen, means to produce a spot of light on said screen, means to cause said spot of light to remain in a predetermined position on said screen when the amplitudes of the signals from said beam when in said different quadrants bear a predetermined relation to each other, and means to cause an increase in amplitude of the signal from the beam when in any one quadrant to cause said spot to move in a predetermined direction away from said position, the distance said spot moves corresponding to the increase of amplitude of said signal.

3. A system for guiding an airplane in flight which comprises means to produce a relatively narrow beam of electromagnetic radiation, means to direct said beam at a slight angle to a line forming a predetermined glide path for an airplane, means to revolve said beam about said line while maintaining said angle, a plurality of oscillators, each oscillating at a frequency different from the others, means associated with said revolving means to cause each of said oscillators to control said radiating means during a different predetermined angle of revolution, whereby said beam is modulated with the frequency of said oscillator, means in said airplane to receive said radiation when said airplane is in the vicinity of said beam, means to detect the signal so received, a plurality of filters, each arranged to pass a different one of said modulating frequencies, a screen, means to create a spot of light on said screen, and means to utilize the output of said filters for controlling the position of said spot on said screen.

4. A system for guiding an airplane in flight which comprises means to create a concentrated beam of electromagnetic radiation, means to direct said beam at a slight angle to a line which represents a glide path for an airplane, means to revolve said beam about said line while maintaining said angle, four oscillators, each tuned to a different low frequency, means associated with said revolving means to cause each of said oscillators to control said radiating means during a different quadrant of revolution in such a manner that said radiating means radiates pulses at the frequency of said oscillator which is controlling said radiating means at any given instant, means in said airplane to receive said radiation when said airplane is within the vicinity of said beam, means to detect the signals so received, four filters, there being one tuned to each oscillator frequency, arranged to pass substantially nothing but that particular frequency, means to deliver the detected signal to said filters, a cathode ray tube, means to concentrate the electron beam of said tube into a single spot on the face thereof, means to utilize the difference in signal amplitude between the outputs of two filters corresponding to two opposite quadrants of revolution of said radiation beam to control the position of said electron beam in one plane, and means to utilize the difference in signal amplitude between the outputs of said other two filters corresponding to the other two quadrants of revolution of said radiation beam to control the position of said electron beam in another plane of movement.

5. A system for guiding an airplane in flight which comprises means to create a relatively concentrated beam of electromagnetic radiation, means to direct said beam at a slight angle to a line forming a predetermined glide path for an airplane in making a landing on a landing field, means to revolve said beam about said line while maintaining said angle constant, four oscillators, each tuned to a different frequency from the others, means associated with said revolving means to cause each of said oscillators to control said radiation producing means during a different quadrant of the revolution, means to radiate a succession of pulses at the frequency of a particular oscillator when said oscillator is controlling said radiating means, means in said airplane to receive said radiation, means to detect the signal so received, four filters, each tuned to one of said frequencies so that it will pass substantially nothing else but said frequency, means to pass said detected signal into said filters, a cathode ray tube, electrostatic means to control the electron beam in said tube, said means comprising four deflecting plates, and means to connect the outputs of said filters each to a different one of said deflecting plates.

6. An apparatus for producing a conically revolving beam of electromagnetic radiation which comprises a radio transmitter, a substantially stiff transmission line between said transmitter and said radiator and supporting said radiator, a reflector of electromagnetic radiation supported adjacent said radiator and arranged to concentrate the radiation of said radiator into a beam of relatively small cross section, and means continuously to bend said transmission line and to cause said radiator to trace a predetermined continuous path with respect to said reflector without itself rotating, so as to cause said concentrated beam to revolve in a predetermined manner while maintaining constant the plane of polarization of said radiation.

7. An apparatus for moving a beam of electromagnetic radiation in a predetermined manner comprising a radio transmitter, a radiator, a transmission line connecting said transmitter and said radiator, said transmission line being substantially still and acting to support said radiator, a reflector positioned adjacent to said radiator and arranged to concentrate the radiation therefrom into a beam having a relatively small cross section, the axis of said beam being in the same general direction as said transmission line, a member surrounding said transmission line at a point between said transmitter and said radiator, and means to rotate said member about an axis in the general direction of said transmission line but displaced from it whereby said radiator is revolved about the axis of said reflector without itself rotating.

8. Apparatus of the class described comprising a transmitter, a radiator, a transmission line between said transmitter and said radiator, said line being substantially stiff and serving to support said radiator, a reflector positioned adjacent said radiator and adapted to concentrate the electromagnetic radiation therefrom into a concentrated beam whose axis is in the general direction of the axis of said transmission line, a member surrounding said transmission line and positioned at a point between said transmitter and said radiator and adapted to rotate on an axis substantially parallel to the axis of said transmission line but displaced therefrom, so as to cause said transmission line continuously to bend when said member is rotated, thus causing said radiator to revolve about the axis of said reflector, a plurality of transmitter controlling devices, a commutator associated with said rotatable member for connecting said transmitter controlling devices to said transmitter in sequence as said commutator is rotated, and means to rotate said member.

DAVID T. GRIGGS.

REFERENCES CITED

The following references are of record in the file of this patent:

UNITED STATES PATENTS

| Number | Name | Date |
|---|---|---|
| 2,082,347 | Leib et al. | June 1, 1937 |
| 2,108,867 | Mathieu | Feb. 22, 1938 |
| 2,165,256 | Hansell | July 11, 1939 |
| 2,288,815 | Luck | July 7, 1942 |
| 2,314,795 | Luck | Mar. 23, 1943 |
| 2,405,930 | Goldberg et al. | Aug. 13, 1946 |
| 2,429,601 | Biskeborn et al. | Oct. 28, 1947 |
| 2,433,381 | Marchand | Dec. 30, 1947 |

FOREIGN PATENTS

| Number | Country | Date |
|---|---|---|
| 557,870 | Great Britain | Dec. 9, 1943 |
| 557,903 | Great Britain | Dec. 9, 1943 |